(12) United States Patent
Suzuki et al.

(10) Patent No.: US 7,387,042 B2
(45) Date of Patent: Jun. 17, 2008

(54) TRANSMISSION

(75) Inventors: Osamu Suzuki, Wako (JP); Akihiko Tomoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 11/158,838

(22) Filed: Jun. 22, 2005

(65) Prior Publication Data

US 2006/0011006 A1   Jan. 19, 2006

(30) Foreign Application Priority Data

Jul. 14, 2004   (JP) ............................. 2004-207758

(51) Int. Cl.
    *F16H 63/16* (2006.01)
(52) U.S. Cl. ..................... 74/335; 74/473.36
(58) Field of Classification Search .. 123/197.1–197.5; 74/335, 473.36, 437.37
    See application file for complete search history.

(56) References Cited

U.S. PATENT DOCUMENTS

| | | | | |
|---|---|---|---|---|
| 5,395,293 A * | 3/1995 | Matsuura et al. | ............ | 477/15 |
| 5,740,695 A * | 4/1998 | Janson | .................. | 74/337.5 |
| 6,341,680 B1 * | 1/2002 | Ota et al. | .................. | 192/3.55 |
| 7,178,427 B2 * | 2/2007 | Christensen | ................. | 74/640 |
| 2001/0025755 A1 * | 10/2001 | Ota et al. | .................. | 192/3.56 |
| 2002/0189382 A1 * | 12/2002 | Su | ............................. | 74/337.5 |

FOREIGN PATENT DOCUMENTS

| | | |
|---|---|---|
| EP | 547007 A1 * | 6/1993 |
| EP | 0 911 253 | 4/1999 |
| EP | 1 132 661 | 9/2001 |
| EP | 1 138 546 | 10/2001 |
| JP | 01046046 A * | 2/1989 |
| JP | 5-39865 | 2/1993 |
| JP | 11-82734 | 3/1999 |

* cited by examiner

*Primary Examiner*—Sherry Estremsky
(74) *Attorney, Agent, or Firm*—Hamre, Schumann, Mueller & Larson, P.C.

(57) ABSTRACT

A transmission is provided for changing gears by performing rotation control of a shift drum transmission between an internal combustion engine and a drive wheel by use of an actuator provided on one side of the shift drum and an intermittent feed mechanism driven by the actuator disposed on the other side of the shift drum.

4 Claims, 8 Drawing Sheets

TRANSMISSION

FIELD OF THE INVENTION

The present invention relates to a shift drum drive mechanism of a transmission, and more particularly relates to a transmission including a shift drum driven by an electric motor.

BACKGROUND OF THE INVENTION

As a shift drum drive mechanism of a transmission, there has been well known a so-called manual transmission which performs a gear change actuation by operating a foot-operated pedal and the like to drive a shift spindle and to turn a shift drum. Moreover, there has been known an electric transmission which performs a gear change actuation by driving a shift drum of the transmission by use of an electric motor. For example, one of such electric transmissions adopts a driving method for driving a shift spindle by use of an electric motor instead of the foot-operated pedal operation described above while adhering fundamentally to a driving method for driving a shift spindle by use of the foot-operated pedal operation. For example, see Japanese Patent Laid-Open No. Hei 11 (1999)-82734 (Pages 4 and 5, FIG. 5)

Furthermore, as another method of the electric transmission described above, there has been known a method for driving a shift drum by use of an intermittent feed mechanism that is a Geneva stop mechanism. For example, see Japanese Patent Laid-Open No. Hei 5 (1993)-39865 (Pages 3 and 4, FIG. 5). This electric transmission has a structure in which structural parts related to driving of the drum, in other words, an electric motor that is a driving source for the drum, a gear driving mechanism for transmitting a driving force of the motor, the Geneva stop mechanism that is the intermittent feed mechanism, and the like are concentrated and disposed on one side of the shift drum.

Moreover, there has been also known a transmission which changes gears by selectively driving rotation of a shift drum by use of an electric motor or a manual operation of a knob and the like.

Incidentally, a kind of modification example, described above, of the conversion from the foot-operated shift drum driving method in a vehicle equipped with the known manual transmission to the driving by use of the electric motor can be perceived as the transmission described in Japanese Patent Laid-Open No. Hei 11 (1999)-82734 described above. This driving method is an improved method in which foot-operated drive of the shift spindle is changed to the driving by use of the electric motor. This improved driving method achieves the sharing of many parts while maintaining a basic structure of foot-operated shift drum drive.

In the method described above, it is hoped that a certain degree of margin of capacity and size is provided for the electric motor because an output of a driving source, that is, an output of the electric motor needs to correspond to a spring for fixing a position of the shift drum and a return spring of the shift spindle. Moreover, this method adheres to the structure of the manual transmission in that the shift spindle is extended parallel to the shift drum on the outside thereof. Thus, there is also a desire to simplify the structure for the addition of the motor.

Moreover, an improvement based on the shift drum driving method by use of the electric motor according to Japanese Patent Laid-Open No. Hei 5 (1993)-39865 described above has a characteristic that, in this driving method, the electric motor that is the driving source for the shift drum, the gear driving mechanism, the intermittent feed mechanism, and the like are concentrated and disposed on one side of the shift drum. Thus, this shift drum driving method is significantly different from the manual driving method described above in terms of the structure. Consequently, there will be many changes in the structure along with a change of the manual driving method into a motorized method.

In consideration of the foregoing problems, it is an object of the present invention to achieve the sharing of parts while maintaining the foot-operated shift drum driving method in the manual transmission described above, and to obtain an electrical shift drum driving method which is simplified by a minimum structural change.

SUMMARY OF THE INVENTION

The present invention relates to an improvement of a transmission for solving the foregoing problems, and more particularly relates to an improved structure with emphasis on a shift drum driving method. A transmission, which is adapted to change gears by performing rotation control of a shift drum transmission provided between an internal combustion engine and a drive wheel by use of an actuator, is characterized in that the actuator is provided on one side of the shift drum, and an intermittent feed mechanism driven by the actuator is disposed on the other side of the shift drum.

The present invention provides a transmission in which the actuator is provided on one side of the shift drum, and the intermittent feed mechanism driven by the actuator is disposed on the other side of the shift drum. Thus, a drive mechanism part is divided, and an increase in size of the mechanism part and complexity thereof are prevented. Accordingly, applicability thereof is improved. Moreover, flexibility in disposition of parts of the mechanism for driving on the both sides of the shift drum is increased, and an advantage in designing is secured.

Moreover, the transmission is characterized in that a shift spindle which transmits a force of the actuator to the intermittent feed mechanism penetrates the inside of the shift drum. Thus, there is no need to provide another spindle for driving the shift drum on the outside of the drum, and changes in an internal combustion engine case part such as a crankcase in disposition of the drum can be suppressed as minimum as possible. Moreover, since the shift spindle is housed in the shift drum, a peripheral structure of the drum is simplified and downsized. Thus, handleability thereof is improved.

Furthermore, the intermittent feed mechanism is characterized in that it is an internal gear type Geneva stop mechanism. Thus, space can be saved, and changes in an internal combustion engine case part such as a crankcase in disposition of the stop mechanism can be reduced.

In addition, a transmission including a shift drum transmission provided between an internal combustion engine and a drive wheel is characterized in that a shift spindle penetrates the inside of a shift drum. Thus, there is no need to provide another spindle for driving the shift drum on the outside of the drum, and changes in an internal combustion engine case part such as a crankcase in disposition of the drum can be suppressed as minimum as possible. Moreover, since a peripheral structure of the shift drum can be simplified. Thus, the shift drum is downsized, and handleability thereof is improved.

DETAILED DESCRIPTION OF THE INVENTION

Figure 1:
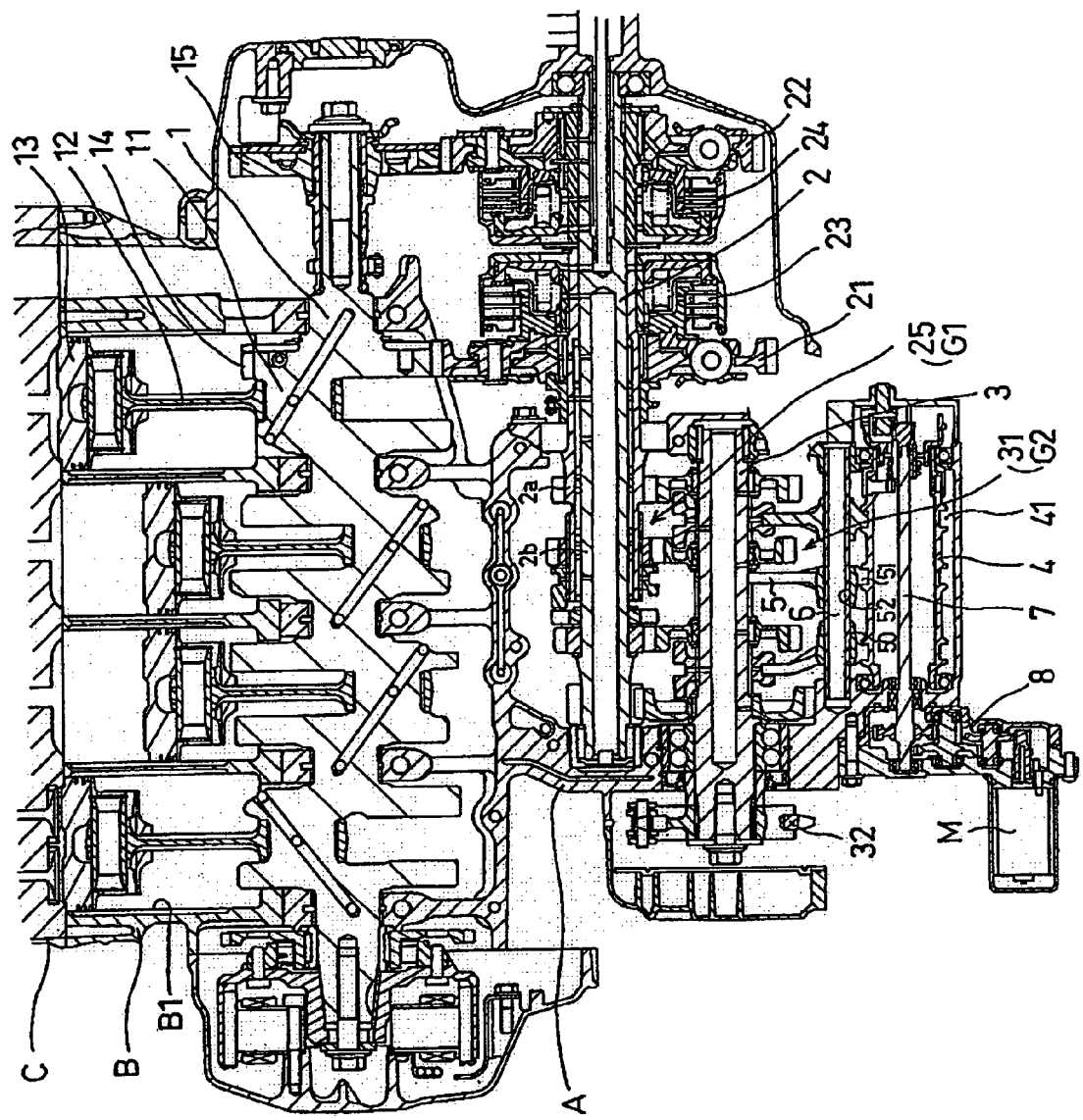
FIG. 1 is a longitudinal sectional view of an internal combustion engine according to an embodiment of the present invention, schematically showing a main part of the engine.
Figure 2:
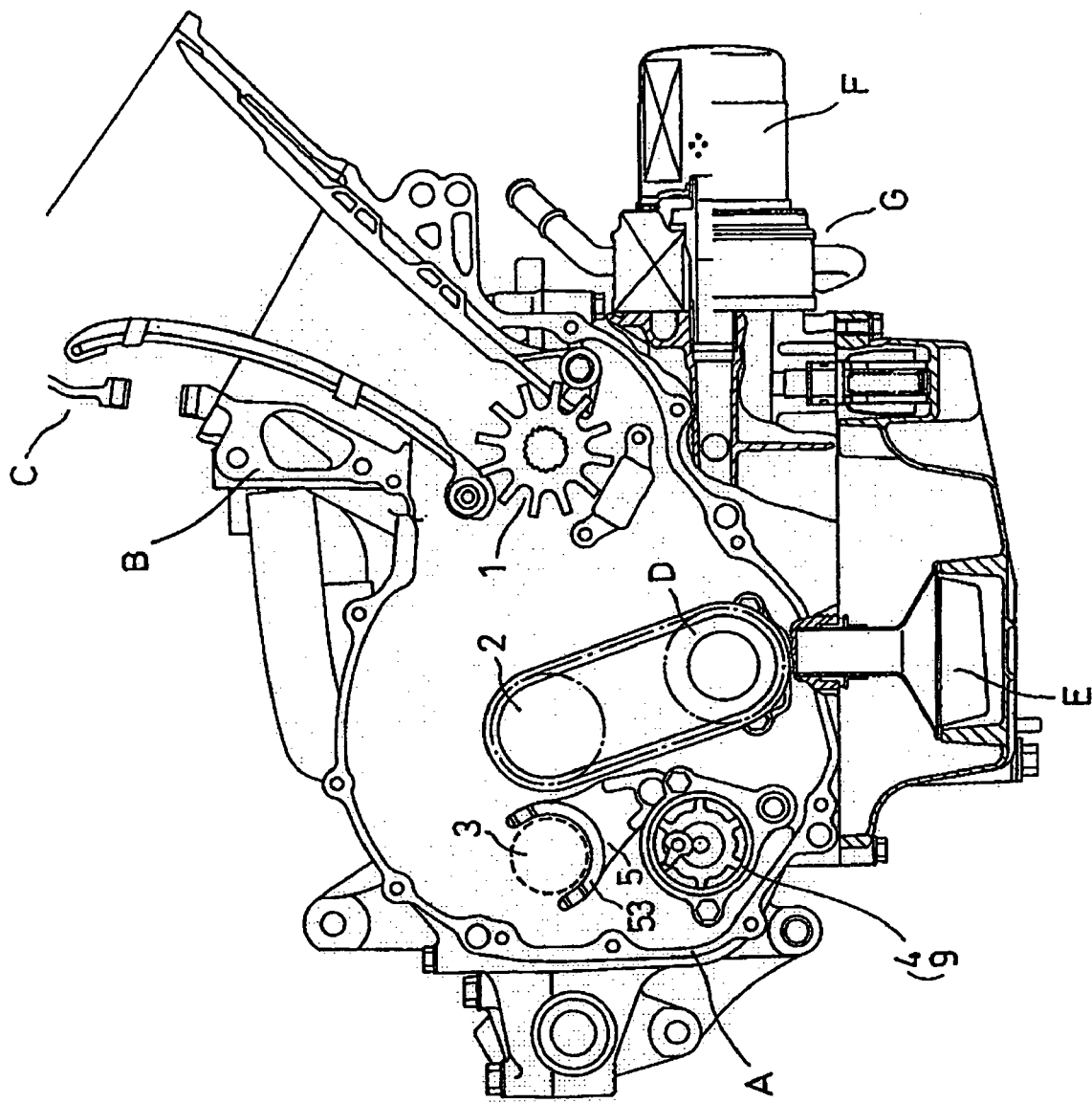
FIG. 2 is a cross-sectional side view of the internal combustion engine according to the embodiment of the present invention, schematically showing the main part of the engine.

FIGS. 1 and 2 show a part of a vehicle internal combustion engine structure of the present invention, and a structural part of a transmission, which is integrally constructed with the structural part of the engine.

An internal combustion engine E includes: an engine case formed of a crankcase A and a cylinder block B as an integral structure; a cylinder head C which is connected to an upper part of the cylinder block B of the engine case, and is not clearly illustrated; a cylinder head cover; and the like.

In the crankcase A, a crankshaft 1 is supported so as to be rotatable by means of a journal part, and pistons 13 are supported by connecting rods 12 in four crankpins 11, respectively. These pistons 13 slide back and forth in respective cylinder bores B1 formed in the cylinder block B of the engine case. The internal combustion engine E of this embodiment is a 4-cylinder, 4-cycle, internal combustion engine.

The transmission includes a main shaft 2 and a counter shaft 3 which are disposed parallel to the crankshaft 1 and to each other in the crankcase A.

Two driven gears 21 and 22 are loosely fitted to the main shaft 2. The driven gear 21 is slightly larger than the driven gear 22, and meshes with a smaller drive gear 14 of the crankshaft 1. The smaller driven gear 22 meshes with a larger drive gear 15 of the crankshaft 1.

The main shaft 2 consists of two shafts which are disposed coaxially with each other. A clutch 23 is attached to a first shaft 2a that is a hollow shaft of the main shaft: A clutch 24 is attached to a second shaft 2b which penetrates the first shaft 2a. The driven gear 21 is integrally connected to the clutch 23, and the driven gear 22 is integrally connected to the clutch 24. Therefore, by selecting clutch engagement of any of the clutches 23 and 24, a rotational driving force of the crankshaft 1 is transmitted to the first shaft 2a through engagement of the drive gear 14 and the driven gear 21 or to the second shaft 2b through engagement of the drive gear 15 and the driven gear 22.

Speed change gears 25 are attached to the first shaft 2a or the second shaft 2b of the main shaft 2. These gears 25 substantially form a gear group G1 including a plurality of the speed change gears 25 attached to the main shaft 2 formed of the both shafts 2a and 2b.

Meanwhile, a gear group G2 is attached to the counter shaft 3, the gear group G2 including a plurality of speed change gears 31 capable of arbitrarily and selectively meshing with predetermined gears of the gear group G1 including the plurality of speed change gears 25 attached to the main shaft 2. Moreover, in the counter shaft 3, a sprocket 32 for driving unillustrated drive wheels for running of a vehicle is also provided.

In the main shaft 2 and the counter shaft 3, a gear shift mechanism is provided, which performs a desired gear change by selecting engagement of predetermined speed change gears 25 and 31 among the gear groups G1 and G2 attached to the both shafts 2 and 3. This gear shift mechanism includes: a shift drum 4 in which a plurality of cam grooves 41 are driven and rotated by an electric motor M to be described later, the grooves being formed on an outer peripheral surface of the shift drum 4; and shifters 5 which include guide pins 51 fitted into these cam grooves 41 and make selective engagement of the speed change gears 25 and 31 by moving from side to side in FIG. 1 in response to rotation of the shift drum 4. Note that, in FIG. 2, D is an oil pump, E is an oil strainer, F is an oil filter, and G is an oil cooler.

Figure 3:
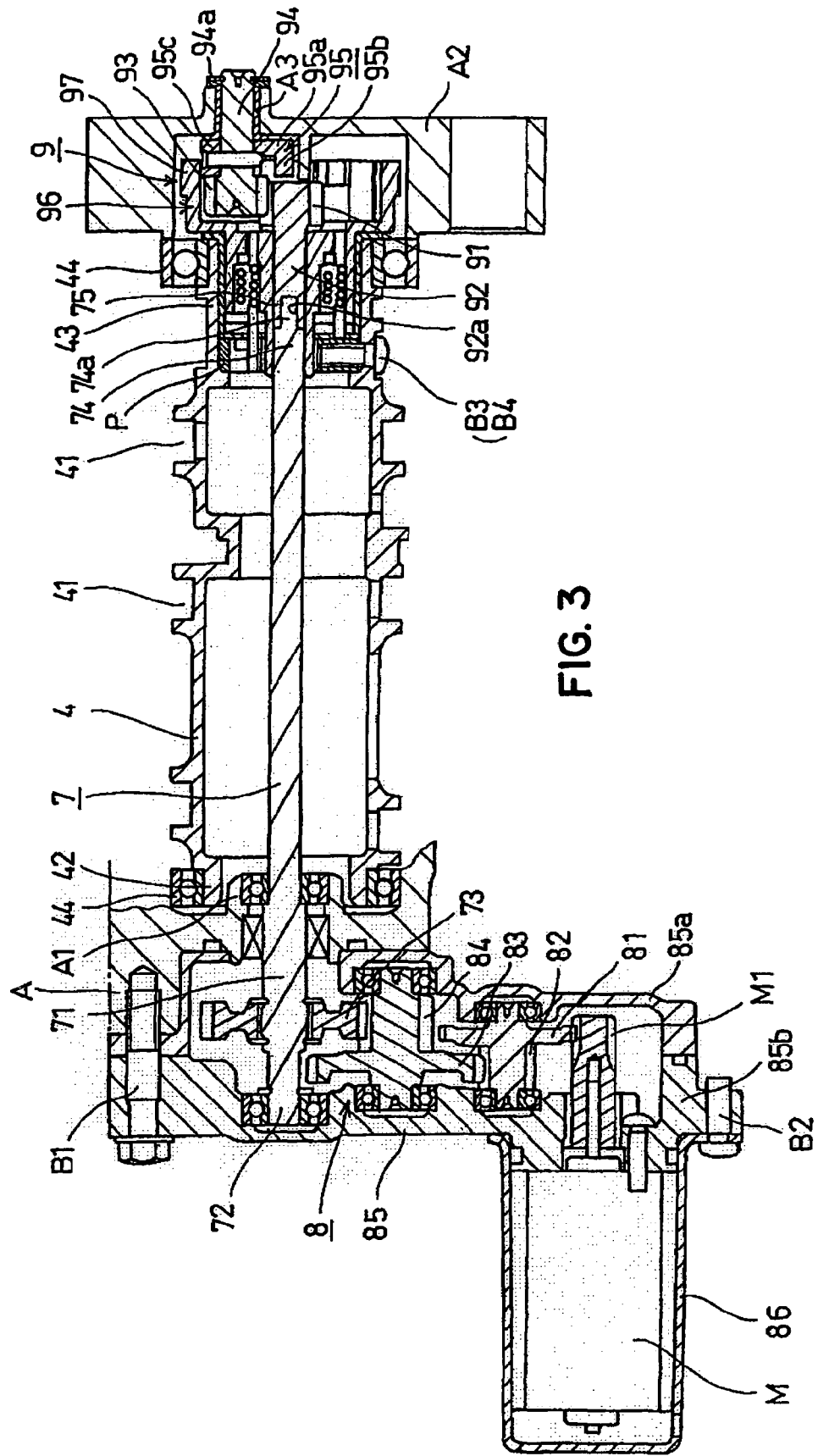
FIG. 3 is a view showing a main part of a shift drum drive part of the present invention.
Figure 4:
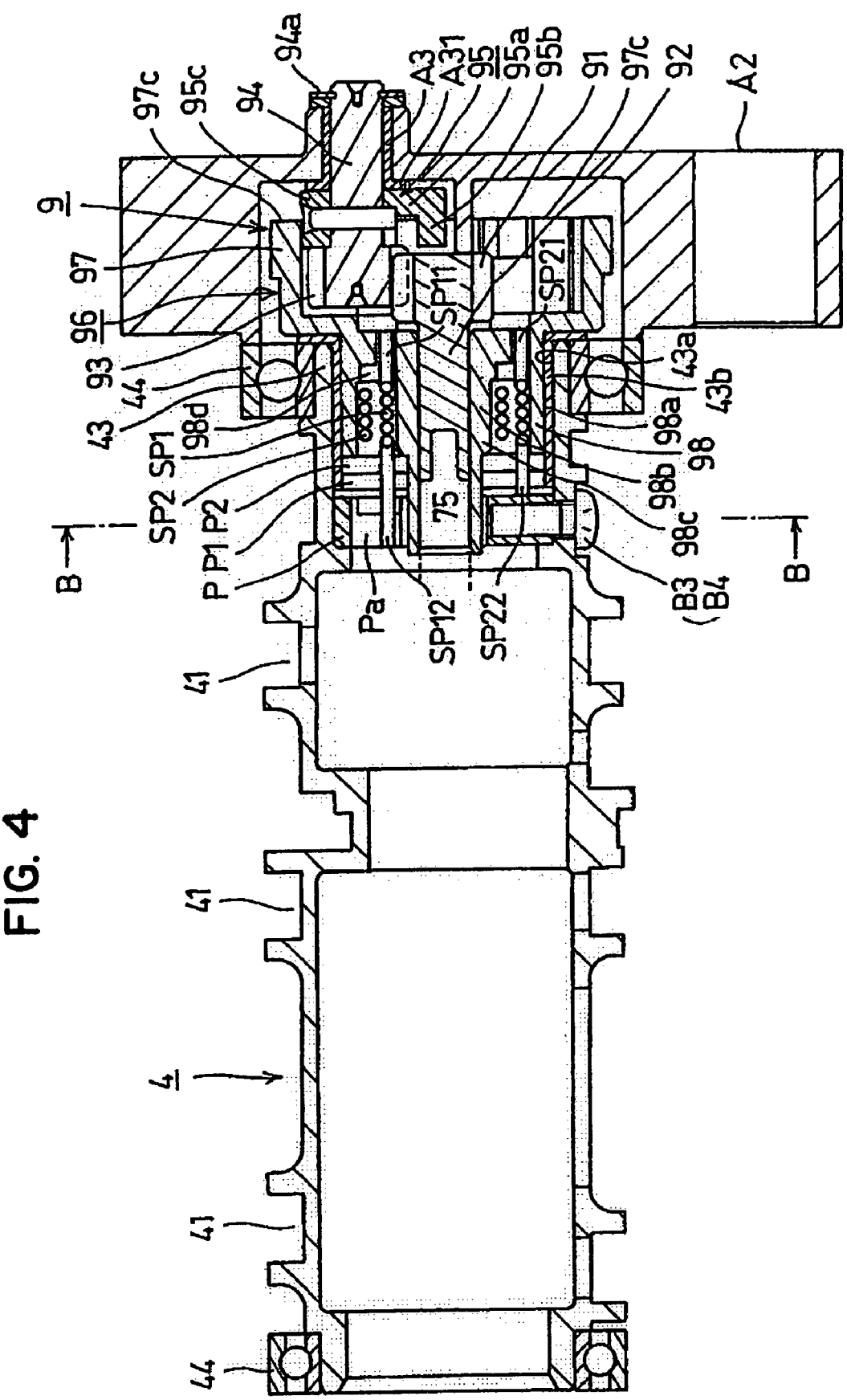
FIG. 4 is a cross-sectional side view showing a shift drum and a Geneva stopper mechanism attached to the shift drum according to the present invention, and is also a cross-sectional view along the line A-A in FIG. 5.

With reference to FIGS. 3 and 4, a structure of the shift drum 4 and a drive mechanism for rotation of the shift drum 4 will be described in some detail.

With reference to FIGS. 3 and 4, the shift drum 4 has a hollow cylindrical body having a predetermined length and a predetermined diameter. In a peripheral part thereof, the already described cam grooves 41 for moving the shifters are formed. These cam grooves 41 are extended with a predetermined depth in the peripheral part. As can be understood from FIG. 1, the guide pins 51 of the shifters 5 are fitted into the cam grooves 41, and base sliding holes 52 thereof are slidably fitted to a shift fork shaft 6 disposed parallel to the shift drum 4. Accordingly, the shifters 5 are movably provided for a gear change actuation to be described later in a left-right direction in FIG. 1 with respect to the shift drum 4.

As shown in FIG. 3, the shift drum 4 includes protrusions 42 and 43 on its both ends, the protrusions being cylindrical openings. The shift drum 4 is supported by a part of the crankcase A in such a manner that respective peripheral parts of the protrusions 42 and 43 are rotatably supported by ball bearings 44. In the inside of the hollow shift drum 4, a shift spindle 7 that is a substantial drive shaft of the shift drum 4 penetrates. In the inside of the left cylindrical protrusion 42 shown in the drawing, the spindle 7 is supported by a bearing A1 that is a structural part of the crankcase A, the bearing A1 being disposed so as to face the inside of the protrusion 42. Moreover, a shaft end 72 of a shaft part 71 extended from the bearing A1, substantially from the inside of the cylindrical protrusion 42 to the outside of the drum 4, is supported by a bearing provided in a gear case 85 to be described later.

A gear 73 is attached to the extended shaft part 71 of the shift spindle 7, the shaft part 71 being extended to the outside from the inside of the left cylindrical protrusion 42. This gear 73 is drivingly connected to a pinion gear M1 provided on a shaft of the electric motor M through a gear driving mechanism 8 that is a reduction mechanism. Specifically, the pinion gear M1 on the electric motor shaft meshes with a first large diameter gear 81, a first small diameter gear 82 provided coaxially with the first large diameter gear 81 meshes with a second large diameter gear 83, and a second small diameter gear 84 provided coaxially with the second large diameter gear 83 meshes with the gear 73 of the extended shaft part 71 of the shift spindle 7. Accordingly, the gear 73 is drivingly connected to the pinion gear M1 through the gear driving mechanism 8. Thus, the shift spindle 7 is rotated and driven by drive of the electric motor M.

The reduction gear driving mechanism 8 including an engagement structure of the multiple reduction gears described above is disposed on the outside of the crankcase A. This gear driving mechanism 8 is housed in the gear case 85 split into two pieces.

One split case 85*a* of the gear case 85 is made to come into contact with one side of the crankcase A, and the gear driving mechanism 8 is attached. Thereafter, the other split case 85*b* is attached to the one split case 85*a* so as to cover the gear driving mechanism 8 from the outside. By fastening and fixing the split case 85*b* with a bolt B1, the case 85 is attached and fixed to the crankcase A.

In the gear case 85, a motor case 86 is attached, the motor case 86 housing the electric motor M that maintains gear engagement connection for driving the gear driving mechanism 8 described above. Specifically, the motor case 86 is attached by making an attachment opening thereof come into contact with a motor attachment opening of the other split case 85*b* of the gear case 85 and fastening the motor case 86 and the other split case 85*b* with a bolt B2.

In the inside of the right cylindrical protrusion 43 of the shift drum 4, the other shaft end 74 of the shift spindle 7 is connected through a joint 75 to a shaft part 92 of a drive gear 91 of a Geneva stop mechanism 9 that is an intermittent feed mechanism to be described later. The joint 75 is a structural part in which a shaft end concave part 92*a* of the shaft part 92 of the drive gear 91 and a convex part 74*a* of the shaft end 74 of the shift spindle 7 are fitted and connected to each other. By means of this joint 75, the shift spindle 7 and the drive gear 91 are integrally rotated together (see FIG. 3). Moreover, in the inside of the right cylindrical protrusion 43 of the shift drum 4, a part of the Geneva stop mechanism 9 and a part of a drive mechanism which transmits a driving force of the shift spindle 7 to the shift drum 4, such as a housing part for torsion springs SP1 and SP2 to be described later, are housed.

The drive gear 91 forms the Geneva stop mechanism 9 that is the intermittent feed mechanism, together with a driven gear 93, a drive rotor 95, a driven rotor 96, and the like, which will be described below. A teeth part of the drive gear 91 is located at a position extended from the inside of the cylindrical protrusion 43. At this position, the driven gear 93 meshes with the drive gear 91.

The driven gear 93 is rotatably supported by means of a sleeve bearing A3 in a cover member A2 of the crankcase A at a position near an outer end of a shaft part 94.

In a shaft portion between a teeth part of the shaft part 94 of the driven gear 93 and a bearing supporting part by the sleeve A3, the drive rotor 95 including a drive pin 95*b* and an arc-shaped convex part 95*c* is attached. Specifically, the drive pin 95*b* is provided on a tip of an arm 95*a* extended radially outward from the shaft portion and is located at a position radially distant from a rotation axis center of the shaft part 94 of the driven gear 93. Moreover, the arc-shaped convex part 95*c* is formed opposite to the pin 95*b* and is slightly protruded in the radial direction from the driven gear 93. In its attachment state, the drive rotor 95 has its outer portion come into contact with a side of a flange part A31 (see FIG. 4) of the sleeve A3. The contact of the drive rotor 95 with the side of the flange part A31 of the sleeve A3 forms a slipping-out prevention structure for the driven gear 93 in cooperation with attachment of a catch 94*a* to a shaft end of the shaft 94 of the driven gear with a washer interposed therebetween.

Figure 7A:
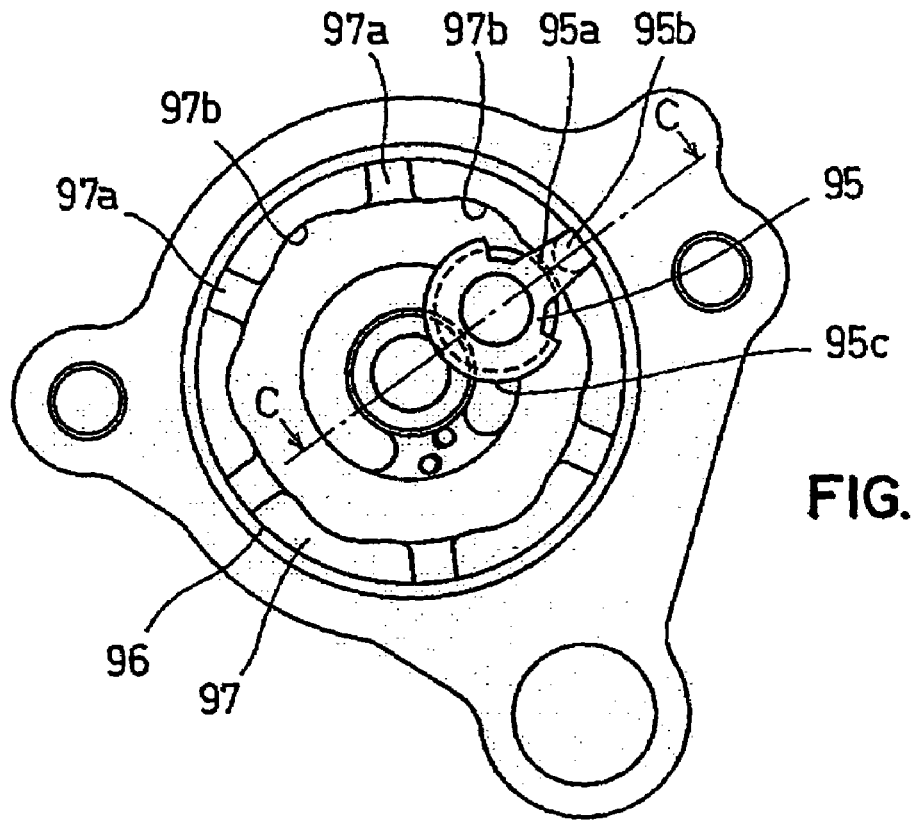
FIG. 7A is a front view and FIG. 7B is a cross-sectional view along the line C-C in FIG. 7A, showing an operational state of the Geneva stopper mechanism of the present invention, in which a drive pin of the drive rotor reaches an upper dead center.
Figure 7B:
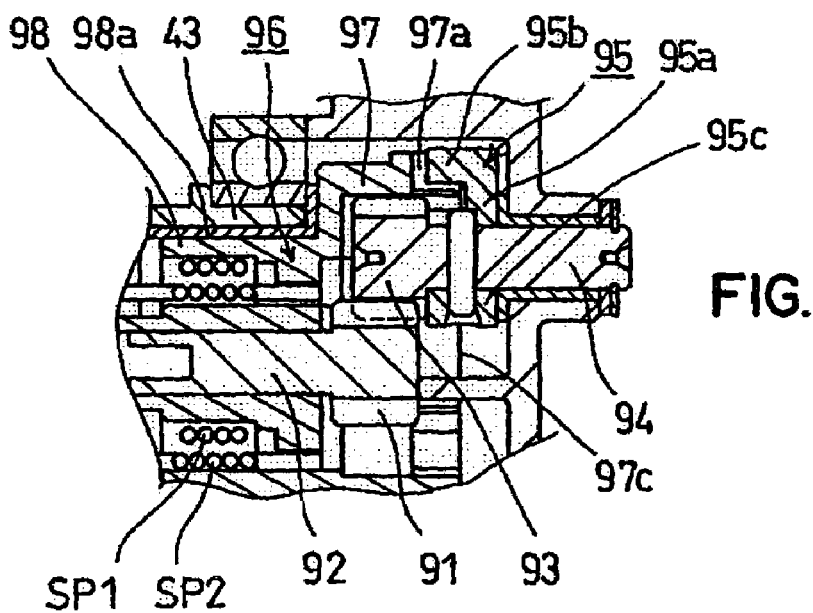

With reference to FIGS. 7A and 7B, on a peripheral side of the drive rotor 95, a large ring-shaped cylindrical part 97 of the driven rotor 96 to be described later is positioned. Specifically, the ring-shaped cylindrical part 97 includes (see FIG. 7A): a plurality of radially oriented and extended groove parts 97*a* with which the drive pin 95*b* is slidingly engaged in the rotation of the drive rotor 95; and a plurality of arc-shaped concave parts 97*b* with which the arc-shaped convex part 95*c* comes into contact.

The driven rotor 96 includes (see FIG. 4): the already described large ring-shaped cylindrical part 97 which has an outside diameter substantially larger than that of the right cylindrical protrusion 43 of the shift drum 4, which is positioned on the outside of the protrusion 43, and which is extended in the rotation axis direction; and a ring-shaped protrusion 98 which has an outside diameter much smaller than that of the ring-shaped cylindrical part 97, and which is positioned inside the right cylindrical protrusion 43 of the shift drum 4.

As shown in FIG. 4, an outer peripheral part 98*a* of the ring-shaped protrusion 98 of the driven rotor 96 is supported by a sleeve 43*b* in an inner peripheral part 43*a* of the cylindrical protrusion 43 of the shift drum 4. At the same time, a boss part 98*c* of an inner base 98*b* thereof is extended in the rotation axis direction while covering the above-described shift spindle 7 and the joint 75 of the shaft part 92 of the drive gear 91, and is supported by the joint 75. Accordingly, the driven rotor 96 is formed as a rotor which can be rotated relatively to the shift drum 4 and the shift spindle 7.

The large ring-shaped cylindrical part 97 of the driven rotor 96 includes, in its outer end surface 97*c*, the above-described groove parts 97*a* with which the drive pin 95*b* of the drive rotor 95 described above is slidingly engaged (see also FIG. 7B).

The groove parts 97*a* are provided in accordance with the number of stages of the speed change gears. The plurality of groove parts 97*a* are provided at even intervals in a circumferential direction of the outer end surface 97*c* of the cylindrical part 97. Since this embodiment is based on a 5-speed transmission, each of 6 groove parts 97*a* in total including a groove part corresponding to a neutral position is formed at 60-degree intervals in the circumferential direction.

As is clear from FIGS. 7A and 7B, these groove parts 97*a* are extended radially outward with extending directions thereof all directed toward the center of the shaft. The groove parts 97*a* are formed in a shape obtained by cutting off portions of the surface part of the outer end surface 97*c* of the ring-shaped cylindrical part 97 by a predetermined depth and a predetermined width. As a result, the groove parts 97*a* are grooves cut through from the inner periphery to the outer periphery in the outer end surface 97*c* so as to scrape off a part of an inner peripheral part adjacent to the outer end surface 97*c* of the cylindrical part 97 and a part of an outer peripheral part adjacent to the outer end surface 97*c* of the cylindrical part 97. The above-described predetermined depth and width of the groove parts 97a are determined in relation to the drive pin 95b of the drive rotor 95.

In the inner peripheral part left to be relatively wide between the respective groove parts 97a obtained by cutting off a part of the inner peripheral part adjacent to the outer end surface 97c of the cylindrical part at even intervals, the arc-shaped concave parts 97b for engagement with the arc-shaped convex part 95c of the drive rotor 95 are formed. Therefore, these 6 arc-shaped concave parts 97b are also provided at even intervals. In other words, the 6 arc-shaped concave parts 97b are formed at 60-degree intervals so as to correspond to the 5 speed change gears and the neutral position. The shape of the arc-shaped concave parts 97b is determined in relation to the shape of the arc-shaped convex part 95c of the drive rotor 95 and will be described later. Engagement of the both arc-shaped convex and concave parts 95c and 97b secures a retained state in a position corresponding to a predetermined speed change gear.

The drive pin 95b of the drive rotor 95 is rotated through rotation of the arm 95a in switching of a predetermined speed change gear for a gear change. By this rotation, the drive pin 95b is slidingly engaged with a groove part 97a corresponding to a predetermined speed change gear of the driven rotor 96. In one forward or backward rotation, the drive pin 95b is slidingly engaged with one of the groove parts 97a corresponding to the predetermined speed change gear. In this sliding engagement, the driven rotor 96 can be rotated at a 60-degree rotation angle in this embodiment. In other words, the drive rotor 95 is slidingly engaged with a groove part 97a corresponding to a predetermined speed change gear of the driven rotor 96 only within a 60-degree range in a forward or backward 360-degree rotation. Accordingly, the driven rotor 95 is rotated and driven for intermittent feed within a moving range at the rotation angle of 60 degrees (see also FIGS. 8A to 8C).

Moreover, the drive rotor 95 has a structure in which, at a position of the drive pin 95b directed to a rotation axis center O of the driven rotor 96 in rotation of the drive rotor 95 (see FIG. 5), the arc-shaped convex part 95c positioned opposite to the drive pin 95b of the drive rotor 95 is engaged with the arc-shaped concave part 97b of the driven rotor 96 and retained. Thus, a relatively stable and retained state of the drive rotor 95 and the driven rotor 96 is secured at a predetermined selectable speed change gear position. As a result, the shift drum 4 is retained by means of the driven rotor 96. Therefore, switching of a speed change gear in a gear change is achieved by intermittent feed of the drive rotor 95 for each rotation in a selected direction, such as forward or backward, in other words, an upshift direction or a downshift direction.

Back to FIG. 4 again, inside the right cylindrical protrusion 43 of the shift drum 4, the ring-shaped protrusion 98 of the driven rotor 96 is rotatably housed and supported as described above. A periphery of the boss part 98c of the inner base 98b of the ring-shaped protrusion 98 is formed to be a ring-shaped concave part 98d. Two torsion springs SP1 and SP2 having diameters different from each other are attached to the ring-shaped concave part 98d.

Among the two torsion springs, the torsion spring SP1 having a small diameter is disposed close to the inside of the ring-shaped concave part 98d while coming close to the periphery of the boss part 98c of the inner base 98b of the ring-shaped protrusion 98 so as to surround the periphery. One end SP11 of the spring SP1 is engaged with a base of the boss part 98c of the ring-shaped concave part 98d, and the other end SP12 is engaged at a position close to an inner periphery of a spring stop plate P to be described later through two sliding contact plates P1 and P2. The other torsion spring SP2 having a large diameter is disposed close to the outside of the ring-shaped concave part 98d so as to follow and surround an upper wall of the ring-shaped concave part 98d. One end SP21 thereof is engaged with the upper wall of the ring-shaped concave part 98d, and the other end SP22 thereof is engaged at a position somewhat close to the outside of the spring stop plate P to be described later through the two sliding contact plates P1 and P2.

Figure 6:
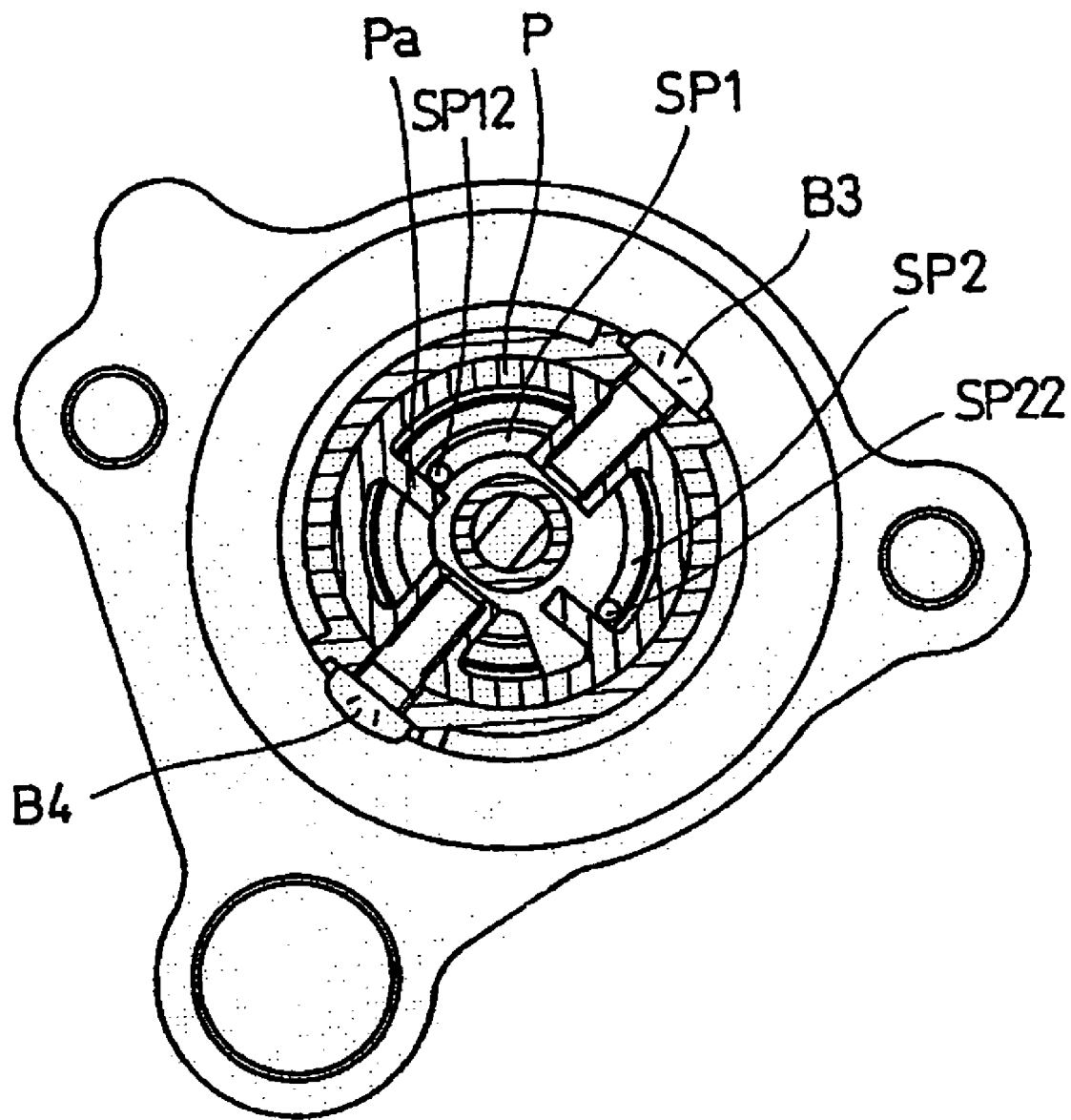
FIG. 6 is a view showing a torsion spring attachment structure inside the shift drum of the present invention, and is a cross-sectional view along the line B-B in FIG. 4.

As shown in FIGS. 3 and 4, the spring stop plate P is formed of a ring-shaped member having a predetermined width. An outer peripheral part thereof is fitted in a deepest portion, i.e. to the left in the drawing, in the inner peripheral part 43a of the right cylindrical protrusion 43 of the shift drum 4. At this position, the plate P is fastened and fixed with bolts B3 and B4 from the outside of the shift drum 4. This fastening and fixation with the bolts B3 and B4 are performed by screwing the two bolts B3 and B4 from positions opposite to each other at a 180-degree angle on the outside of the shift drum 4 (see FIG. 6).

In the inner periphery of the spring stop plate P, a pair of protrusions Pa extended so as to face each other from the inner periphery to the inside of the plate P is provided. Each of these protrusions Pa is set to be an engaging part for each of the other ends SP12 and SP22 of the above-described one and the other torsion springs SP1 and SP2. Although the other ends SP12 and SP22 of the torsion springs SP1 and SP2 are engaged with the protrusions Pa just by coming into contact therewith, contact directions thereof in a circumferential direction are opposite to each other (see FIG. 6).

As described above, the two torsion springs, the one torsion spring SP1 and the other torsion spring SP2, having different diameters from each other have their one ends SP11 and SP21 engaged with the partial structural part of the ring-shaped concave part 98d, that is, the driven rotor 96, and have their other ends SP12 and SP22 engaged with the spring stop plate P, that is, substantially the shift drum 4. Moreover, these two torsion springs SP1 and SP2 are engaged with the driven rotor 96 and the shift drum 4 so as to allow torsional stresses in directions opposite to each other to act between the both members, that is, between the driven rotor 96 and the shift drum 4. Therefore, the both torsion springs SP1 and SP2 are balanced and set in a neutral state when there is no action of torque for driving the shift drum 4.

Meanwhile, as described above, in the peripheral part of the shift drum 4, the cam grooves 41 are provided. As shown in FIG. 1, the shifters 5 are provided for the respective cam grooves 41 by means of the guide pins 51 fitted into the grooves. The shifters 5 disposed in the cam grooves 41, in other words, the shifters 5 have their base parts 50 fitted into the cam grooves 41 by the guide pins 51. Moreover, sliding holes 52 of the base parts 50 are slidably fitted into and supported by the shift fork shaft 6.

Among the shifters 5 supported by the shift fork shaft 6, two thereof are set to be the shifters 5 used for movement of a predetermined speed change gear 31 in the gear group G2 attached to the counter shaft 3, and the other one is set to be the shifter 5 used for movement of a predetermined speed change gear 23 in the gear group G1 attached to the main shaft 2. The respective shifters 5 are guided by the shift fork shaft 6 through the sliding holes 52 of the base parts 50 for movement of the predetermined speed change gear 25 or 31 in the gear groups G1 or G2 described above, and are slid from side to side. Each of the shifters 5 has its tip portion formed as a biforked shift fork portion 53 (see FIG. 2) for movement of the speed change gears 25 or 31.

This biforked shift fork portion 53 is engaged around circumferential grooves of a sleeve of the predetermined speed change gear 25 or 31 in the gear group G1 or G2 on the main shaft 2 or the counter shaft 3 so as to surround a part of the circumferential grooves. Along with movement of the shifter 5 by rotation of the shift drum 4 based on a gear change operation, the speed change gears 25 and 31 are slid from side to side on the shafts 2 and 3 through the gear sleeve.

The structure of the shift drum 4 and the drive mechanism for the drum 4 have been described above.

Here, driving of the shift drum 4 in a gear change operation will be briefly described.

Figure 5:
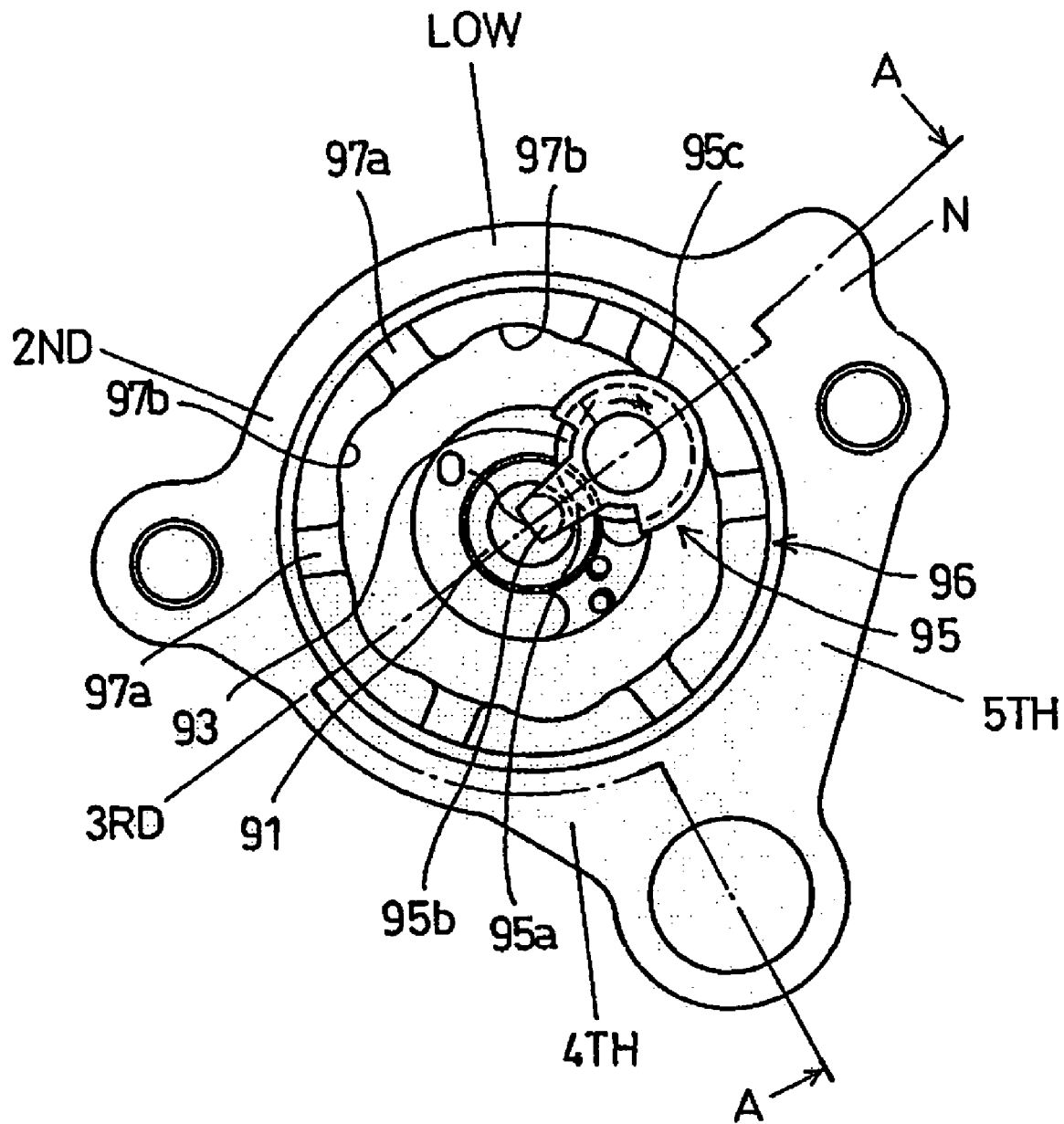
FIG. 5 is a view showing the Geneva stopper mechanism of the present invention, and showing a neutral position where an arc-shaped convex part of a drive rotor is fitted into an arc-shaped concave part of a driven rotor.

For example, the location of the drive rotor 95 shown in FIG. 5 shows the neutral position N. In this state, the drive pin 95b at the tip of the arm 95a of the drive rotor 95 is directed to the rotation axis center O of the driven rotor 96. The arc-shaped convex part 95c opposite to the drive pin 95b is engaged with an arc-shaped concave part 97b between neighboring groove parts 97a of the driven rotor 96, that is, the arc-shaped concave part 97b corresponding to the neutral position N. Accordingly, the drive rotor 95 and the driven rotor 96 are retained without moving relatively to each other.

The clutch 21 is let out for a gear change, the electric motor M for actuating the gear change is driven, a driving force of the motor M is transmitted to the shift spindle 7 through engagement of the gears in the reduction gear driving device 8, and the drive gear 91 on the right end 74 of the spindle 7 is rotated.

The rotation of the drive gear 91 is transmitted to the drive rotor 95 through engagement with the driven gear 93, and the drive rotor 95 is rotated clockwise (in the arrow X direction) in FIG. 5, for example.

Figure 8A:
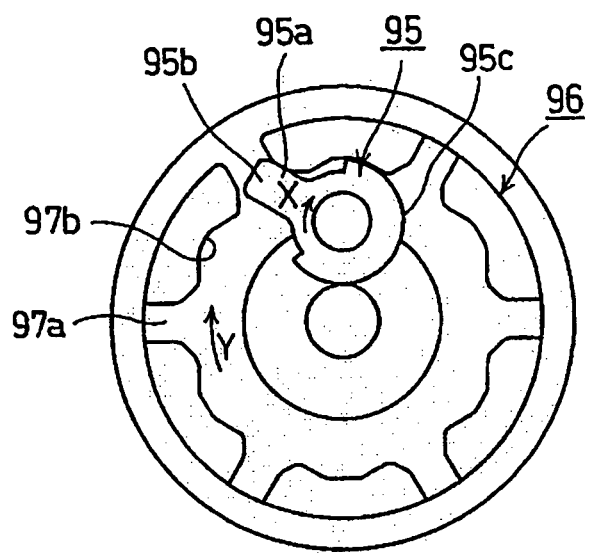
FIGS. 8A to 8C are views for explaining an operation of the Geneva stopper mechanism of the present invention.
Figure 8B:
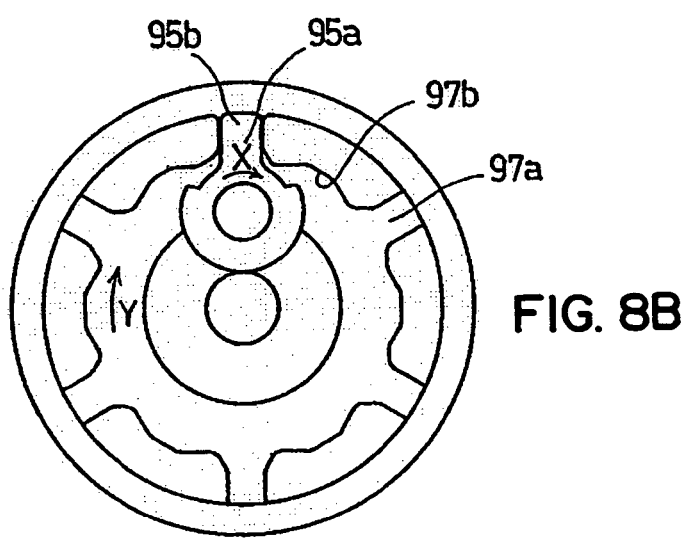
Figure 8C:
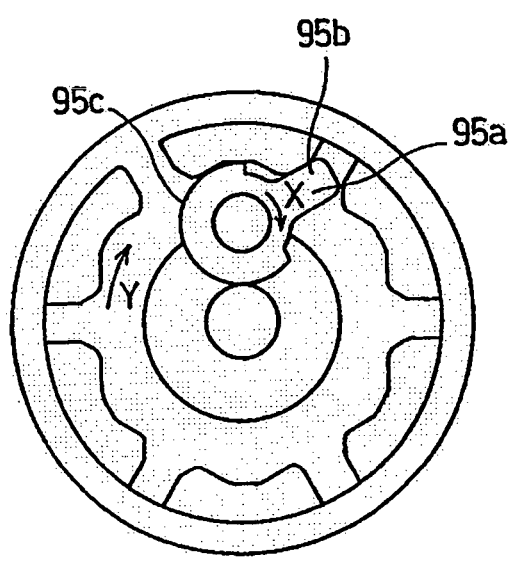

The drive pin 95b at the tip of the arm 95a of the drive rotor 95 which has started to be rotated is slid from the neutral position N shown in FIG. 5 and engaged with the groove part 97a of the driven rotor 96 in order to achieve intermittent feed for selection of a first gear LOW in the shift drum 4 shown in FIG. 8A (see FIG. 8A).

The sliding engagement of the drive pin 95b with the groove part 97a by the rotation of the drive rotor 95 in the X direction causes a pressing action of the driven rotor 96 through the groove part 97a. Accordingly, the driven rotor 96 is rotated in a Y direction along with the rotation of the drive rotor 95.

Thereafter, the both rotors, in other words, the drive rotor 95 and the driven rotor 96 are allowed to retain a relationship with each other in which, in the rotation described above based on the sliding engagement, the drive pin 95b in the groove part 97a of the driven rotor 96 is slid in one reciprocating motion while substantially returning at an upper dead center in the groove part 97a along with the pressing action described above (see FIG. 8B).

Specifically, first-half sliding of the drive pin 95b from initial engagement with the groove part 97a to the upper dead center is a forward movement, and last-half sliding of returning at the upper dead center is a backward movement. Accordingly, the driven rotor 96 is rotated by the sliding of the drive pin 95b in one reciprocating motion for a predetermined amount, that is, to a position where a rotation angle reaches 60 degrees (see FIG. 8C). At the point where the rotation angle reaches 60 degrees, the drive pin 95b of the drive rotor 95 gets out of the groove part 97a of the driven rotor 96, and simultaneous rotation of the both rotors is released. In this event, the intermittent feed for selection of the first gear LOW in the shift drum 4 is substantially completed, and the shifter 5 accomplishes switching of the speed change gear.

At the same time as release of the simultaneous rotation of the both rotors, the driven rotor 96 is immediately stopped since a load resistance thereof is large. The release of the simultaneous rotation, although not being illustrated, is accordingly detected by detection means. Thus, the electric motor M stops its actuation. However, the drive rotor 95 is not immediately stopped due to its rotational inertia, and is slightly rotated relatively to the driven rotor 96 in its stopped state. Accordingly, the arc-shaped convex part 95c opposite to the drive pin 95b is engaged with the arc-shaped concave part 97b of the driven rotor 96, that is, the arc-shaped concave part 97b corresponding to the first gear LOW. Thus, the drive rotor 95 is stopped.

The above-described rotation Y of the driven rotor 96 is transmitted from the large cylindrical part 97 of the rotor 96 to the shift drum 4 by means of the torsion springs SP1 and SP2 through the ring-shaped protrusion 98 of the rotor 96 positioned in the cylindrical protrusion 43 of the shift drum 4. Thus, the shift drum 4 is rotated for a predetermined amount. To be more specific, in the Y-direction rotation, rotation of the ring-shaped protrusion 98 of the driven rotor 96 is transmitted from the one end SP11 of the torsion spring SP1 having the small diameter through the other end SP12 thereof to the shift drum 4 by means of the protrusion Pa of the spring stop plate P. Thus, the shift drum 4 is rotated for the predetermined amount.

As can be understood from FIG. 1, in the rotation of the shift drum 4 for the predetermined amount, the predetermined shifter 5 for selection of the first gear LOW is moved by means of the guide pins 51 fitted into the cam grooves 41 in the peripheral part of the shift drum 4. Accordingly, the intermittent feed for selection of the first gear LOW in the shift drum 4 is completed as described above in the actuation of rotation at 60 degrees that is the rotation angle of the driven rotor 96 described above. Meanwhile, the speed change gears 25 and 31 in the gear groups G1 and G2 on the main shaft 2 and the counter shaft 3 are switched for the first gear LOW.

The gears 25 and 31 are switched for a gear change to the first gear LOW. At the same time, as described above, the arc-shaped convex part 95c of the drive rotor 95 is fitted into the arc-shaped concave part 97b corresponding to the first gear LOW of the driven rotor 96. Thus, the drive rotor 95 is stopped, and a stable retained state in the fitting described above is secured. In this state, the clutch 21 or 22 which has been previously let out for a gear change is engaged, and the vehicle runs on the first gear LOW.

An intermittent feed actuation for a subsequent gear change to a second gear 2ND, and intermittent feed actuations for switching the speed change gears 25 and 31 further to a third gear 3RD, a fourth gear 4TH, and a fifth gear 5TH are also performed as described above.

Note that an engagement/disengagement operation of the clutch 21 or 22 in the gear change can be accordingly performed in conjunction with driving of the electric motor M.

In this embodiment, a rotary electric motor M is used as an actuator for driving the shift drum 4. However, instead of the rotary electric motor M, a hydraulic motor, for example, can be used. Moreover, a reciprocating piston mechanism can be also used. In this mechanism, a piston reciprocating actuation by use of an oil pressure or a gas pressure is set to be rotational drive of the shift spindle 7 by means of an engagement mechanism of a rack gear and a pinion gear. The spindle 7 is rotated and driven in forward movement of the piston, and the drive of the spindle 7 is released in backward movement of the piston. A ratchet mechanism is therefore provided.

Since the shift drum drive mechanism of the transmission of the present invention includes the configuration as described above, the following operational effects can be achieved.

A method for driving the shift drum 4 in a conventional manual transmission is basically maintained, and drive by the electric motor M is performed instead of foot-operated pedal drive. Thus, structural changes in parts of the manual transmission are suppressed as minimum as possible. Moreover, most of the parts can be shared, and costs for motorization can be reduced.

The electric motor M as the actuator for driving the shift drum 4 is disposed on one side of the shift drum 4, and the intermittent feed mechanism 9 driven by the electric motor M is disposed on the other side of the shift drum 4. Accordingly, the drive mechanism for driving the shift drum 4 is divided on the both sides of the shift drum 4. Thus, an increase in size of the drive mechanism part and complication thereof are eliminated. Moreover, a sufficient space for disposition of the parts of the mechanism increases flexibility in designing.

With regard to a dispositional structure, the shift spindle 7 for driving the shift drum 4 penetrates the hollow part inside the shift drum 4 and connects the above-described divided drive mechanism of the shift drum 4 to each other. Thus, there exist no other shaft members for driving the shift drum 4 on the outside of the drum 4. Accordingly, changes in the crankcase A (the engine case) are reduced. Moreover, a peripheral structure of the shift drum 4 is simplified and downsized.

A part of the drive mechanism of the shift drum 4 is housed in the drum 4. Thus, dispositions of the parts of the drive mechanism around the drum 4 are organized, and saving of space for disposing the parts of the drive mechanism is achieved.

The Geneva stop mechanism 9 has a structure in which the drive rotor 95 to which a drive torque of the motor M is transmitted is disposed inside the driven rotor 96. Saving of space is achieved, and changes in the crankcase A (the engine case) can be accordingly reduced.

Although the Geneva stop mechanism 9 is used in this embodiment, another intermittent feed mechanism such as a parallel cam mechanism of an internal contact type can be also used.

Although embodiments of the present invention have been described thus far, the present invention is not limited to the examples in the drawings and the embodiments described above, and various modification may be made without departing the scope of the present invention, as a matter of course.

We claim:

1. A transmission which is adapted to change gears, said transmission provided between an internal combustion engine and a drive wheel comprising:
    a shift drum having a generally cylindrical shape, including:
        a first side, and
        a second side,
            wherein the first side and the second side are spaced axially opposite along a major axis of the shift drum;
    an actuator provided on the first side of the shift drum; and
    an intermittent feed mechanism driven by the actuator disposed on the second side of the shift drum.

2. The transmission according to claim 1, wherein a shift spindle which transmits a force of the actuator to the intermittent feed mechanism penetrates the inside of the shift drum.

3. The transmission according to claim 1, wherein the intermittent feed mechanism is an internal gear type Geneva stop mechanism.

4. A transmission for changing gears of a vehicle, comprising:
    a shift drum transmission provided between an internal combustion engine and a drive wheel, said shift drum transmission having:
    a shift drum, having:
        at least one cam groove on an outer peripheral surface of the shift drum, wherein the cam groove is configured to accent from radially outside a guide pin of a shifter,
        first and second sides, wherein the first side and the second side are spaced axially opposite along a major axis of the shift drum, and
        an interior therebetween; and
    a shift spindle extending parallel to the major axis through said first side, through said interior, and through said second side of said shift drum to provide driving force for changing gears.

* * * * *